United States Patent [19]

Judd

[11] Patent Number: 5,790,717
[45] Date of Patent: Aug. 4, 1998

[54] APPARATUS AND METHOD FOR PREDICTING SUBJECTIVE QUALITY OF COMPRESSED IMAGES

[75] Inventor: Thomas Helm Judd, Madison, N.J.

[73] Assignee: Bell Communications Research Inc., Morristown, N.J.

[21] Appl. No.: 143,007

[22] Filed: Oct. 26, 1993

[51] Int. Cl.$^6$ ................................... G06K 9/36
[52] U.S. Cl. ................................... 382/323
[58] Field of Search ............... 382/56, 41, 54, 382/420; 358/433

[56] References Cited

U.S. PATENT DOCUMENTS

| | | | |
|---|---|---|---|
| 5,144,688 | 9/1992 | Bovir et al. | 382/166 |
| 5,148,498 | 9/1992 | Resnikoff et al. | 382/218 |
| 5,282,255 | 1/1994 | Bovik et al. | 382/266 |

OTHER PUBLICATIONS

"Moving Picture Group MPEG: A Video Compression Standard for Multimedia Applications," Didier LeGall Communications of the ACM, vol. 34, No. 4, Apr. 1991.

"Codec for Audiovisual Services at n × 384 kbit/s," CCITT H.261, Rec. H.261, pp. 120–128, 1988.

"The JPEG Still Picture Compression Standard," Communications of the ACM, G. K. Wallace, pp. 30–44, Apr. 1991.

*Primary Examiner*—Jose L. Couso
*Attorney, Agent, or Firm*—Joseph Giordano; David A. Hey; Loria B. Yeadon

[57] ABSTRACT

An apparatus and method are described for predicting a subjective quality rating associated with a reference image compressed at a given level. My apparatus includes components for, and my method includes steps of, storing a digitized color image representing a reference image in memory and compressing at a given level and decompressing the reference image to produce a processed image. My apparatus and method also entail converting the reference image and the processed image each to a grayscale image and dividing each grayscale image into an array of blocks. My apparatus and method further entail generating a first intensity variance array corresponding to the array of blocks of the grayscale reference image and a second intensity variance array corresponding to the array of blocks of the grayscale processed image. Lastly, my apparatus and method entail generating a variance ratio based on the first and second intensity variance arrays, determining a block variance loss based on the variance ratio, and generating the subjective quality rating indicated by the impairment level which is based on the variance loss.

14 Claims, 3 Drawing Sheets

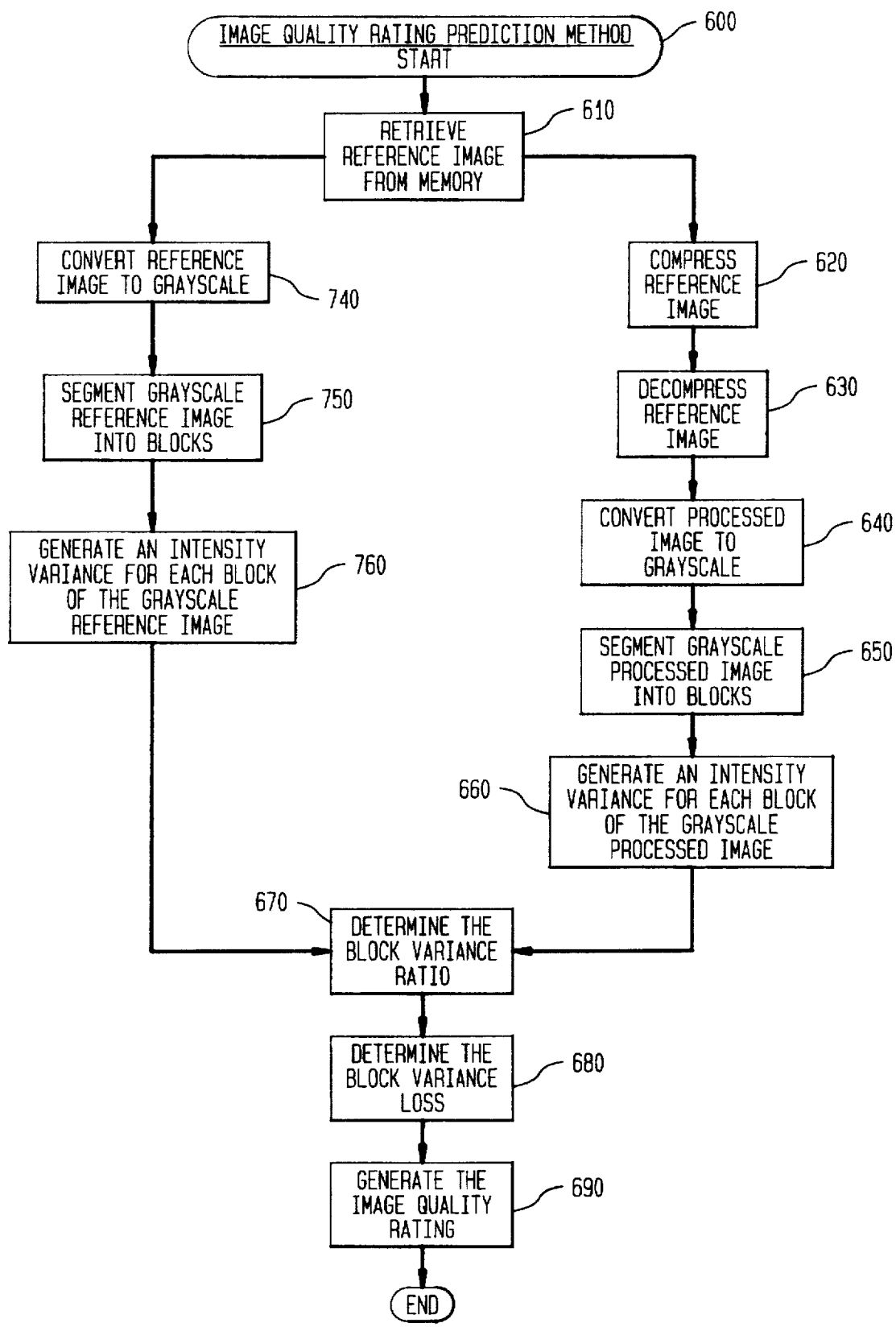

APPARATUS AND METHOD FOR PREDICTING SUBJECTIVE QUALITY OF COMPRESSED IMAGES

FIELD OF THE INVENTION

This invention relates to an apparatus and method for predicting subjective quality of compressed images.

BACKGROUND OF THE INVENTION

Interactive multimedia services are soon to be a large commercial market, and there are a number of ways of delivering multimedia services. One technique of delivering multimedia to customers is to compress the multimedia to fixed, moderate bit rates using media compression and transport the compressed multimedia over existing telephony networks, which are currently used for transporting relatively low-speed telephony services. Media compression makes use of medium-specific and human cognitive properties to compress bandwidth intensive multimedia, such as photographic images and full-motion video. Joint Photographic Experts Group (JPEG), Moving Picture Expert Group (MPEG), and CCITT H.261 are examples of media compression techniques. ("The JPEG Still Picture Compression Standard," *Communications of the ACM*, G. K. Wallace, April 1991, pp. 30–44 (hereinafter Wallace), "MPEG: A Video Compression Standard for Multimedia Applications," Didier LeGall *Communications of the ACM*, Vol. 34, No. 4, April 1991), and "Codec for Audiovisual Services at n×384 kbit/s ," Rec. H.261, pgs. 120–128, 1988). JPEG is a collaboration between CCITT and ISO and refers to an international digital image compression standard for continuou-stone (color or grayscale) images. For example, one can use JPEG for processing still images and MPEG and H.261 for processing motion video.

When an image is processed using a compression/decompression technique, a viewer may perceive a reduction in the image quality of the processed image in comparison to the original image. Therefore, to control subjective image quality, images are compressed and decompressed, and then viewed by a human tester(s) for adequate image quality prior to the compressed image being recorded in memory or transmitted to an actual viewing audience.

FIG. 1 illustratively depicts a representative apparatus from the prior art for implementing a conventional approach to controlling image quality of processed images involving a human tester. The reference image to be processed is input to a compression module 11, which compresses the image using a compression technique, such as JPEG. The compressed image is then decompressed at decompression module 12. The decompressed image is viewed by a human tester 13 who subjectively rates the image quality of the processed image. The rating of the tester is then used to adjust the level of compression of the image at module 11. The image is iteratively processed (compressed/decompressed) until the human tester gives a subjective image quality rating at or above a pre-determined level. Upon an adequate rating of image quality being given by the tester, switch 15 is closed, which permits the compressed media to be stored in memory 16 for subsequent transmission to requesting viewers. This iterative and human interactive approach to image quality control is not only time consuming, but also costly and subject to viewer-to-viewer variations.

Attempts have been made to develop objective measures to predict the subjective image quality (or impairment, which is roughly the inverse of image quality) of compressed and decompressed media such that the need for a human tester can be eliminated. Accuracy measures, based on color retention, hue change, and color change have been employed to predict image quality, but such measures have been deemed poor image quality and impairment predictors. Although accuracy measures have shown some correlation with the subjectively-measured impairment levels, the image-to-image variation have been found to be quite large.

Operational measures, which are based on parameters that directly relate to the compression operation, have also been proposed to predict subjective image quality and impairment. The operational measure based on level of compression, which is expressed as the number of bits of image information per pixel (bits/pixel) required to represent an image in compressed form, has been widely used as an image quality and impairment predictor. (See Wallace). This measure of image quality has been particularly common among those involved in research and development of compression coding techniques.

Studies have indicated that there is a degree of correlation between bits/pixel and subjective impairment levels, particularly at the extremes of compression. It has also been found that a compressed color image represented by 1.5 bits/pixel or more could be considered to have good quality (none to slight impairment) while an image represented by less than 1 bit/pixel would have poor quality (definitely to extremely objectionable impairment). The relationship between impairment rating and bits/pixel has been found to be strongly dependent on image content between the ranges of 1.0 and 1.5 bits/pixel.

The use of bits/pixel as an impairment predictor is representative of current practice. For example, in Wallace, the following correlation between compression and image quality has been reported for grayscale images:

0.25–0.5 bit/pixel: moderate to good image quality
0.5–0.75 bit/pixel: good to very good image quality
0.75–1.5 bits/pixel: excellent image quality
1.5–2.0 bits/pixel: image quality usually indistinguishable from the original But, in practice, these quality levels have been found to be merely broad guidelines as to the subjective quality achievable with a particular level of compression. One reason for inaccuracy and unreliability of bits/pixel as an image quality/impairment predictor is that quality and compression can vary significantly according to the reference image characteristics and scene content. Thus, while bits/pixel is a convenient measure that is often used as a guide to subjective quality of compressed images, it lacks the precision needed for applications where accurate control of compressed image file sizes is important.

Therefore, an object of my invention is an apparatus and method for predicting subjective image quality of processed images having greater precision than prior prediction measures.

A further object of my invention is an apparatus and method for predicting subjective image quality of processed images which alleviate the need for human testers and reduce the time and cost thereassociated.

A further object of my invention is an apparatus and method for reliably predicting subjective image quality independent of image characteristics and content.

Another object of my invention is a quality controlled compression system, employing a subjective image quality prediction apparatus, for compressing a reference image such that a desired image quality is achieved.

SUMMARY OF THE INVENTION

An apparatus and method in accordance with my invention carry out the above-mentioned objects and predict a subjective quality rating associated with a multimedia object, such as a still image, compressed at a given level. My apparatus includes a memory store for storing the reference image to be compressed and for which a quality rating is to be predicted. My apparatus further includes a compressor and decompressor for processing the reference image to produce a processed image. A grayscale converter is employed for converting the reference image and the processed image to grayscale images to produce a grayscale reference image and a grayscale processed image, respectively. My apparatus also includes a segmenting unit for dividing each grayscale image into an array of blocks. An intensity variance processor is employed for determining a first intensity variance array corresponding to the array of blocks of the grayscale reference image and a second intensity variance array corresponding to the array of blocks of the grayscale processed image. A divider is used for generating an array of ratios of the second intensity variance array to the first intensity variance array, and a variance loss processor is employed for determining the block variance loss based on the array of variance ratios generated at the divider. A predicted quality rating indicated by an impairment level, which is generated based on the variance loss, is determined at the quality rating generator.

My method includes the steps of storing a digitized color image (reference image) representing a multimedia object in memory and compressing at a given level and decompressing the reference image to produce a processed image. My method also entails converting the reference image and the processed image each to a grayscale image and dividing each grayscale image into an array of blocks. My method also includes the steps of determining a first intensity variance array corresponding to the array of blocks of the grayscale reference image and a second intensity variance array corresponding to the array of blocks of the grayscale processed image. A variance ratio is then determined based on the first and second intensity variance arrays, a block variance loss is generated based on the variance ratio, and the subjective quality rating is determined based on the variance loss.

BRIEF DESCRIPTION OF THE DRAWING

FIG. 3 depicts a flow diagram presenting an illustrative embodiment of my method of predicting a subjective quality rating of compressed images in accordance with an aspect of my invention.

The organization and operation of the invention will be better understood from consideration of the detailed description of the illustrative embodiments thereof, which follow, when taken in conjunction with the accompanying drawing.

DETAILED DESCRIPTION OF THE INVENTION

In accordance with an aspect of my invention, an apparatus and method are disclosed which predict the subjective quality of an image that has been subjected to compression and decompression, using a media compression technique such as JPEG. My apparatus and method allow the compression of images to a desired level of image quality. My apparatus and method can also be implemented to support author-specified quality levels during creation (authoring) of multimedia documents.

My research has indicated that figures of merit related to the appearance of compressed images, such as JPEG compressed images, provide more consistent correlation between predicted and measured subjective images quality ratings than do measures based on operations or accuracy. Through my research, I have determined that the dominant artifact in images, processed using a compression technique such as JPEG, is blocking, which causes individual areas of the image to lose texture and stand out as individual blocks rather than merge as sub-elements of the image.

By observing that the human visual system is very sensitive to the regular pattern of vertical and horizontal edges produced by blocking, I have found that people use some intuitive measure of the degree of blocking when classifying the quality of images. Based upon this observation, I have invented an apparatus and method of predicting subjective image quality based upon a measure of the degree of blocking in images.

Figure 1:
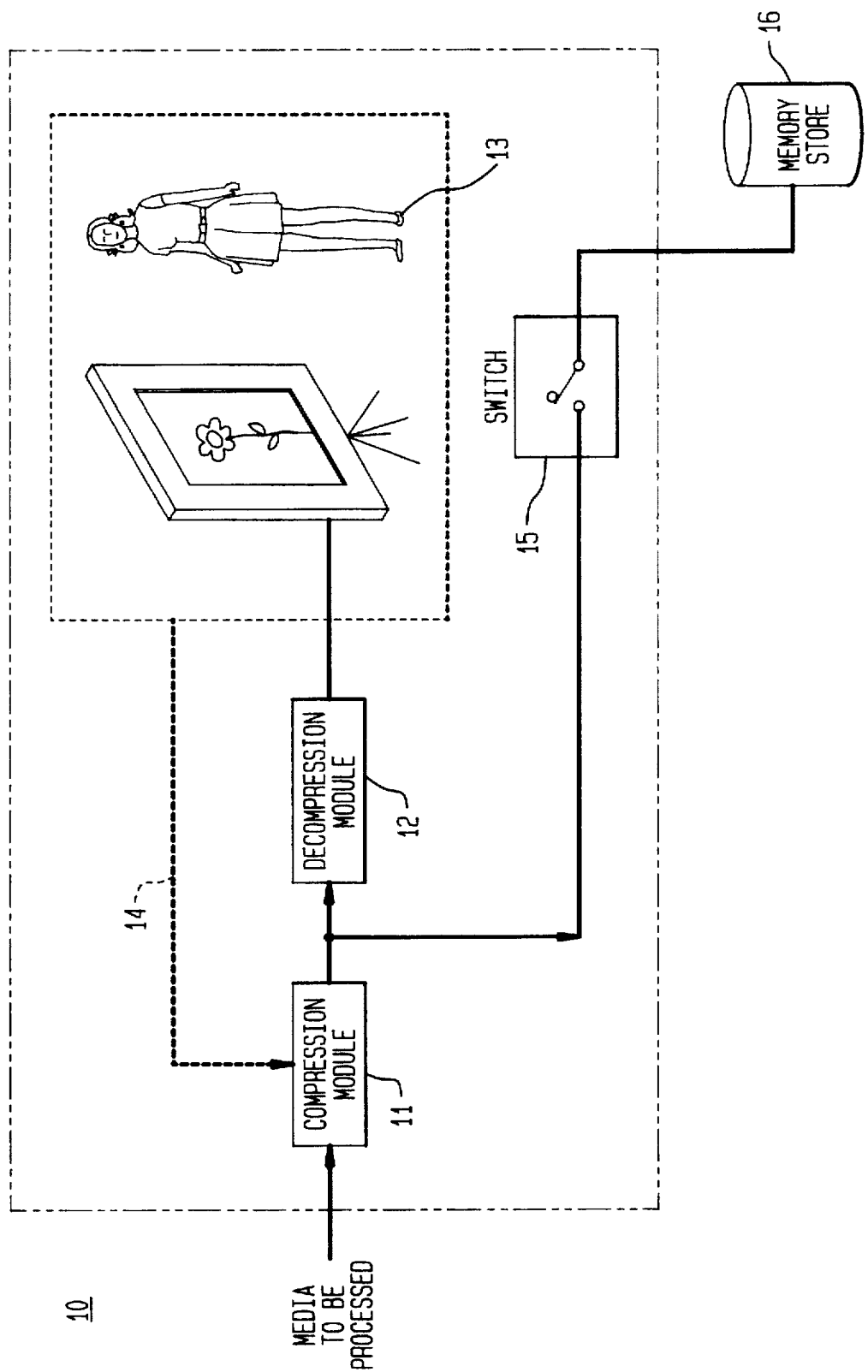
FIG. 1 illustratively depicts a representative system from the prior art for implementing a conventional approach to controlling image quality of processed images involving a human tester.
Figure 2:
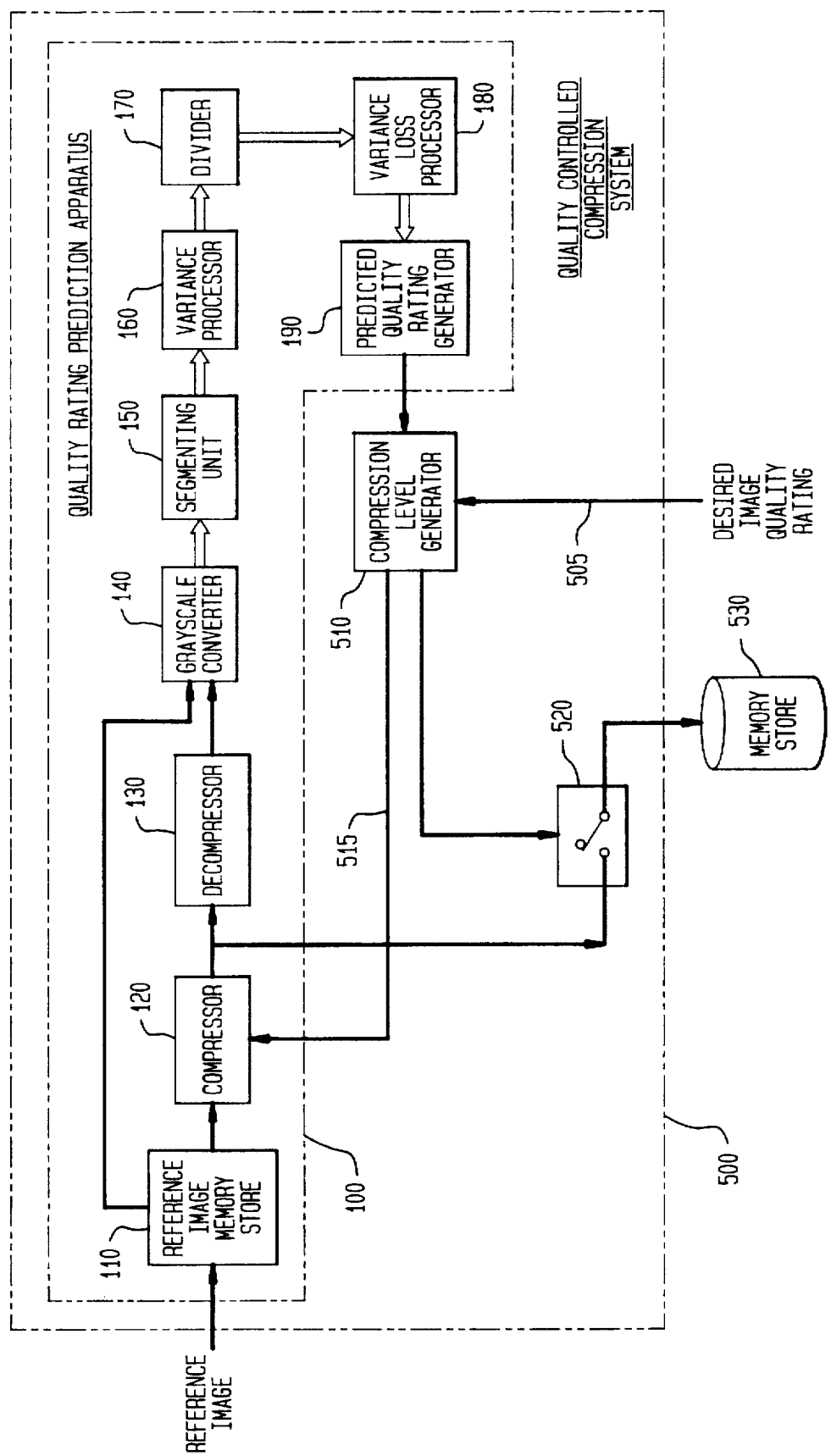
FIG. 2 illustratively depicts, in accordance with an aspect of my invention, an illustrative embodiment of my quality controlled compression system, employing my subjective image quality prediction apparatus, for compressing a reference image such that a desired image quality is achieved.

An illustrative embodiment representing my apparatus 100 for predicting subjective image quality is shown in FIG. 2 and includes a memory store 110 for storing a full-color reference image, which is to be compressed and for which a quality rating is to be predicted. My apparatus further includes a compressor 120, connected to memory store 110, and a decompressor 130, which process the reference image to produce a processed image. In this embodiment, a grayscale converter 140 is also employed and is connected to the memory store 110 and the decompressor 130. The grayscale converter 140 converts the reference image and the processed image to grayscale images to produce a grayscale reference image and a grayscale processed image, respectively. The grayscale converter removes color information from the reference and processed images since, as discussed below, the degree of blocking in images is primarily due to the brightness variations in the image rather than the color changes. If the reference image is monochrome, then the grayscale converter 140 may be omitted.

A segmenting unit 150, is connected to the grayscale converter 140, which unit divides the grayscale images into arrays of blocks to produce an array of blocks for the grayscale reference image and an array of blocks for the grayscale processed image. The pixel block size into which the grayscale images are segmented corresponds to the pixel block size of the compression technique being employed at compressor 120. Assuming that conventional JPEG compression is being implemented, the grayscale images will be segmented into 8×8 pixel blocks.

An intensity variance processor 160 receives the arrays of blocks from the segmenting unit 150 and generates a first intensity variance array corresponding to the array of blocks of the grayscale reference image and a second intensity variance array corresponding to the arrays of blocks of the grayscale processed image. Intensity variance is a measure of the variation in intensity across a block of an image. The ratio of the array of the first intensity variances to the array of the second intensity variances is generated at divider 170, which is connected to the variance processor 160. A variance loss processor 180, connected to the divider 170, determines the block variance loss based on the array of variance ratios generated at the divider 170. A prediction of the quality rating is generated at generator 190 and is indicated by the impairment level, which based on the variance loss determined at processor 180.

My invention entails estimating blocking by measuring the extent to which individual areas of the image have lost texture (content) during processing using various compression techniques, and the above described elements 140, 150, 160, 170, and 180 comprise a blocking estimation processor. Under conventional JPEG compression techniques, JPEG processing is performed by segmenting an image into 8×8 pixel blocks. A block of the image is compressed by discarding high spatial frequency information, which is generally less noticeable to observers than low frequency information. At higher levels of compression, more high-frequency information is lost, and the individual blocks become more uniform in appearance; the segmented pixel blocks then become more noticeable as individual blocks, rather than blending together as sub-elements of the image. The boundaries between these individual blocks form vertical and horizontal lines that observers find objectionable.

In my research, I found that objectionable edges of blocks produced during JPEG processing are primarily due to brightness variations rather than color changes, and I observed that color information can be eliminated from an image, thus only requiring the processing of the brightness information. My method of estimating the degree of blocking entails segmenting an image into pixel blocks as done in conventional JPEG processing. The statistical variance of the brightness both before and after JPEG processing is then determined for each block, and the ratio of processed to unprocessed (reference) variance is determined. This block variance ratio is a measure of the degree to which a block has lost the appearance of being a sub-element of the image.

Through my research, I have heuristically determined that a block becomes quite noticeable when it loses 80% of its original brightness variance, i.e. the block variance ratio falls to 0.2 or less. To estimate the overall effect of blocking on the processed image, block variance loss (VL) is generated, which loss is the percentage of blocks in that image that has lost a pre-determined fraction (e.g., 80%) of their original variance of image intensity. The block variance loss can be used to generate the impairment level, which indicates the subjective quality rating for the image.

To generate a quality rating predictor, I estimated the impairment level due to blocking. Block variance loss was calculated for a test suite of five images over seven Q factors (5, 10, 25, 30, 50, 70 and 90) that spanned a wide quality range for these images. The resulting 35 data points were plotted against actual corresponding subjective impairment levels. To generate the impairment level, I utilized the mathematical function shown in Eq. 1, which approximates the experimental data by a least mean squares fit to the data points modified to provide a better fit at the extremes:

$$IL = 1.40 + 0.14 \, VL - 0.00085 \, VL^2, \tag{1}$$

where IL is the impairment level and VL is the block variance loss. Once the block variance loss has been determined for an image that has been compressed to a particular level using a technique such as JPEG, the polynomial of Eq. 1 can be used to generate the impairment level which indicates the predicted subjective quality rating for that image.

The illustrative steps of my inventive method are depicted in the flow diagram 600 of FIG. 3 and are described below. For illustrative purposes, I assume that an uncompressed, digitized, full-color reference image is stored as a rectangular array of pixels in memory store 110 (See FIG. 2). Each pixel has three components, typically red, green, and blue values (R, G, and B, respectively). An estimate of the subjective quality rating of that image indicated by the impairment level at a given level of compression can be determined as follows.

1. Retrieve the reference image from memory (Step 610), and if the reference image is not monochrome, convert the reference image from R, G, and B color components to monochrome (grayscale) (Step 740). A typical conversion for each pixel is the luminance function used for NTSC television which conversion is mathematically expressed in Eq. 2.

$$\text{Grayscale} = 0.299 \, R + 0.587 \, G + 0.114 \, B \tag{2}$$

2. Segment the grayscale reference image into N×M pixel blocks (step 750). For JPEG compression, blocks of 8 pixels wide by 8 pixels high with any partial blocks at the edges being discarded are most suitable. Each complete JPEG block contains 64 pixels having individual intensities $\alpha_i$.

3. Generate an intensity variance for each block of the grayscale reference image (step 760). Each block has mean intensity $\alpha$. The variance $\mu$ of intensity over the block is the mean square deviation from that mean intensity and is expressed in mathematical form in Eq. 3.

$$\mu = \frac{1}{64} \Sigma (\alpha_i - \bar{\alpha})^2 \tag{3}$$

To simplify processing, the algebraically transformed equivalent version of Eq. 3 expressed in Eq. 4 may be used.

$$\mu = \frac{1}{64} \Sigma \alpha_i^2 - \left( \frac{1}{64} \Sigma \alpha_i \right)^2 \tag{4}$$

Applied over all blocks, this operation yields an array of variance values corresponding to the array of full 8×8 blocks in the grayscale reference image.

4. Subject the reference image to compression (Step 620). Typically, this is done by supplying the JPEG algorithm with a quality factor Q, and results in an image compressed to B bits/pixel.

5. Decompress the compressed image to recover the processed full-color image (Step 630).

6. Convert the processed image to grayscale using the same conversion used in Step 740 (Step 640).

7. Segment the grayscale processed image into blocks as done for the grayscale reference image in Step 750 (step 650).

8. Generate an intensity variance for each block of the grayscale processed image using the same procedure as for the grayscale reference image in Step 760 (Step 660).

9. For each full 8×8 block generated in Step 760 with non-zero variance ($\mu_R$) in the reference image, divide the variance ($\mu_P$) of the processed image from Step 660 by the variance ($\mu_R$) of the reference image from Step 760 to receive the block variance ratio (VR) as expressed mathematically in Eq. 5 (Step 670).

$$VR = \frac{\mu_P}{\mu_R} \tag{5}$$

10. Determine the percentage of blocks with VR ≤ 0.20. This percentage is the 80% block variance loss VL (Step 680).

11. Use VL to generate the impairment level (IL) by applying the polynomial mathematically expressed in Eq. 1, and repeated below (Step 690).

$$IL = 1.4 + 0.14 \, VL - 0.00085 \, VL^2 \tag{1}$$

The value of IL predicts the subjective level of impairment of that processed image, as evaluated by a human observer, and thus IL indicates a subjective quality rating of the processed image. The impairment level is expressed as a value on a categorical rating scale between 1 and 7, where 1 represents a "not perceptible" degree of impairment and 7 represents an "extremely objectionable" degree. This scale follows suggestions of CCIR Recommendation 500. (CCIR, "Recommendation 500-4, Method for the Subjective Assessment of the Quality of Television Pictures," 1990.) Therefore, an impairment level of 1 indicates the best possible subjective image quality rating, and an impairment level of 7 indicates the worst possible subjective image quality rating. Because the polynomial of Eq. 1 can generate impairment levels greater than 7, which are not defined, generated levels of IL greater than 7 can be truncated to 7.

This generated value of impairment level predicts the impairment level and indicates the subjective quality rating for that image at the pre-specified level of compression. The method depicted in FIG. 3 and discussed above predicts the subjective image quality caused by compression, such as JPEG, of full-color or grayscale images.

The application of my quality rating prediction apparatus 100 and method 300 in my quality controlled compression system 500 is shown in FIG. 2. My system compresses a reference image such that a desired image quality rating is achieved and stores the compressed image in memory for subsequent transmission to requesting viewers. In addition to my quality rating prediction apparatus 100, my system 500 comprises a compression level generator 510 and switch 520. My system 500 produces a compressed image having a desired quality rating as follows. My system receives as inputs the reference image to be compressed and a desired image quality rating. Based upon the desired image quality rating, the compression level generator 510 sends an initial compression level to the compressor 120 of my apparatus 100. The apparatus 100 then processes the reference image as described above and depicted in flow diagram 600 of FIG. 3 to yield a predicted quality rating at generator 190.

The quality rating is compared with the desired quality rating at the generator 510, and if the desired quality rating has not been achieved, the compression level generator 510 sends to the compressor 120 a second compression level, and the reference image is again processed using the second compression level. A compression level is iteratively sent to the compressor 120 from the generator 510 based upon the predicted quality rating and the desired quality rating until the desired quality rating is achieved. Upon the desired quality rating being achieved, the compression level generator 510 signals switch 520 to close such that the compressed reference image can be downloaded into memory store 530.

CONCLUSION

I have disclosed an apparatus and method of predicting subjective image quality (i.e. impairment) based upon a measure of the degree of blocking in images. My apparatus includes means for, and my method includes the steps of, estimating the degree of blocking in an image by segmenting the image into pixel blocks, determining the statistical variance of the brightness both before and after processing for each block, generating the ratio of processed to unprocessed variance, and using this block variance ratio as a measure of the degree to which a block has lost the appearance of being a subelement of the image. Finally, the above-described embodiments of the invention are intended to be illustrative only. Numerous alternative embodiments of the present invention may be devised without departure from the spirit and scope of the following claims.

What is claimed is:

1. An apparatus for predicting subjective image quality of a reference image given a pre-specified level of compression, comprising:

a compressor for receiving and compressing the reference image at the pre-specified level of compression;

a decompressor connected to said compressor for decompressing the compressed reference image to produce a processed image;

a blocking estimation processor connected to said decompressor for receiving the reference image and said processed image, said blocking estimation processor including means for segmenting the reference image and said processed image each into an array of blocks, wherein each block has an intensity variation, and means for generating intensity variation loss information regarding the percentage of blocks of said processed image having less than a pre-determined fraction of the intensity variation of a corresponding block of the reference image; and a quality rating generator connected to said blocking estimation processor for generating an impairment level based on said intensity variation loss information, which level indicates a quality rating which predicts the subjective quality of said processed image.

2. An apparatus for predicting subjective image quality of a reference image given a pre-specified level of compression, comprising:

a compressor for receiving and compressing the reference image at the pre-specified level of compression;

a decompressor connected to said compressor for decompressing the compressed reference image to produce a processed image;

a blocking estimation processor connected to said decompressor for receiving the reference image and said processed image, said blocking estimation processor including means for segmenting the reference image and said processed image each into an array of blocks, wherein each block has an intensity variation, and means for generating intensity variation loss information regarding the percentage of blocks of said processed image having less than a pre-determined fraction of the intensity variation of a corresponding block of the reference image, wherein said generating means of said blocking estimation processor includes an intensity variance processor connected to said segmenting means for measuring intensity variation of each block of the reference image and said processed image by determining a first intensity variance array corresponding to the array of blocks of said reference image and a second intensity variance array corresponding to the array of blocks of said processed image, a divider connected to said intensity variance processor for generating an array of ratios of said second intensity variance array to said first intensity variance array, and a variance loss processor connected to said divider for generating intensity variation loss information by determining, based on said array of variance ratios generated at said divider, the percentage of blocks of said processed image having a variance ratio less than or equal to said pre-determined; and a quality rating generator connected to said blocking estimation processor for generating an impairment level based on said intensity variation loss information, which level indicates a quality rating which predicts the subjective quality of said processed image.

3. The apparatus of claim 2 further comprising a memory store for storing the reference image for which a subjective image quality is being predicted.

4. The apparatus of claim 3, wherein said blocking estimation processor further includes a grayscale converter connected between said decompressor and said segmenting means and between said memory store and said segmenting means, for receiving the reference image and said processed image and for converting the reference image and said processed image to a grayscale reference image and a grayscale processed image, respectively.

5. A method for predicting subjective image quality of a reference image processed at a pre-specified level of compression, comprising the steps of:

compressing the reference image at the pre-specified level of compression;

decompressing the compressed reference image to produce a processed image;

segmenting the reference image and said processed image each into an array of blocks, wherein each block has an intensity variance, generating variance loss information regarding the percentage of blocks of said processed image having less than a pre-determined fraction of the intensity variance of a corresponding block of the reference image; and generating an impairment level based on said variance loss information, which level indicates a quality rating which predicts the subjective image quality of said processed image.

6. The method of claim 5 wherein said step of generating variance loss information includes the step of determining a first intensity variance array corresponding to the array of blocks of said reference image and a second intensity variance array corresponding to the array of blocks of said processed image;

generating an array of ratios of said second intensity variance array to said first intensity variance array; and determining, based on said array of variance ratios generated at said divider, the percentage of blocks of said processed image having a variance ratio less than or equal to said pre-determined fraction.

7. The method of claim 6 further comprising the step of storing, in a memory store, the reference image for which a subjective image quality is being predicted.

8. The method of claim 5 further comprises the step of, prior to segmenting the reference image and the processed image, converting the reference image and the processed image to a grayscale reference image and a grayscale processed image, respectively.

9. The method of claim 8 wherein the reference image and said processed image each has red (R), green (G), and blue (B) signal components and wherein said converting step includes extracting brightness information from the reference image and said processed image.

10. The method of claim 9 wherein said converting step further includes the step of executing the following equation to generate said grayscale images:

Grayscale=0.299 $R$+0.587 $G$+0.114 $B$.

11. The method of claim 6 wherein the step of determining said first and second intensity variance arrays includes the step of determining for each block, i, having an intensity $\alpha_i$, a mean intensity $\overline{\alpha}$, wherein the intensity variance, $\mu_i$, of each block is the mean square deviation from said mean intensity as expressed in the following equation:

$$\mu = \frac{1}{64} \Sigma \alpha_i^2 - \left( \frac{1}{64} \Sigma \alpha_i \right)^2.$$

12. The method of claim 5 wherein the step of generating said impairment level (IL) based upon the variance loss information (VL) includes the step of generating said impairment level (IL) based upon the variance loss information (VL) using a least means square fit to the variance loss information.

13. The method of claim 12 wherein the step of generating said impairment level (IL) based upon the variance loss information (VL) further includes the step of executing the following equation:

$IL$=1.4+0.14 $VL$−0.00085 $VL^2$.

14. A system for controlling the image quality of a reference image being compressed such that a pre-specified image quality rating is achieved, comprising:

an apparatus for predicting subjective image quality of a reference image, including
 a compressor for receiving and compressing the reference image at the pre-specified level of compression,
 a decompressor connected to said compressor for decompressing the compressed reference image to produce a processed image,
 a blocking estimation processor connected to said decompressor for receiving the reference image and said processed image, said blocking estimation processor including means for segmenting the reference image and said processed image each into an array of blocks, wherein each block has an intensity variance, and means for generating variance loss information regarding the percentage of blocks of said processed image having more than a pre-determined fraction of the intensity variance of a corresponding block of the reference image, and
 a quality rating generator connected to said blocking estimation processor for generating an impairment level based on said variance loss information, which level indicates a quality rating which predicts the subjective quality of said processed image;

a compression level processor for generating a compression level based on said quality rating received from said quality rating generator and the pre-specified image quality rating and for sending said compression level to said compressor of said apparatus; and a switch, controlled by said compression level processor, for allowing the compressed reference image to be stored in memory when the pre-specified image quality rating has been achieved.

* * * * *

UNITED STATES PATENT AND TRADEMARK OFFICE
CERTIFICATE OF CORRECTION

PATENT NO. : 5,790,717
DATED : August 4, 1998
INVENTOR(S) : Judd

It is certified that error appears in the above-identified patent and that said Letters Patent is hereby corrected as shown below:

Column 10, line 45 after "having" change "more" to --less--.

Signed and Sealed this

Twenty-third Day of February, 1999

Attest:

Q. TODD DICKINSON

*Attesting Officer*        *Acting Commissioner of Patents and Trademarks*